United States Patent
Newns et al.

[11] 3,957,342
[45] May 18, 1976

[54] SODIUM BOROSILICATE GLASSES FOR DIELECTRIC OPTICAL WAVEGUIDES

[75] Inventors: George Reginald Newns, Hintlesham; Keith John Beales, Henley, both of England

[73] Assignee: The Post Office, London, England

[22] Filed: Apr. 25, 1975

[21] Appl. No.: 571,529

[30] Foreign Application Priority Data
July 29, 1974 United Kingdom............. 33484/74
Dec. 9, 1974 United Kingdom............. 53097/74
Jan. 24, 1975 United Kingdom............... 3306/75

[52] U.S. Cl.................................. 350/96 M; 65/32; 65/134; 106/50; 106/54; 350/96 WG
[51] Int. Cl.[2]........................ C03C 13/00; G02B 5/14
[58] Field of Search............... 350/96 WG, 96 M; 106/54, 50; 65/32, 134

[56] References Cited
UNITED STATES PATENTS

| | | | |
|---|---|---|---|
| 3,020,165 | 2/1962 | Davis............................... | 350/96 M |
| 3,531,306 | 9/1970 | Dumbaugh......................... | 106/52 |
| 3,779,733 | 12/1973 | Janakirama-Rao............... | 106/54 X |
| 3,791,714 | 2/1974 | Maurer............................. | 350/96 WG |
| 3,858,964 | 1/1975 | Piesslinger et al............... | 106/54 |
| 3,868,170 | 2/1975 | DeLuca............................ | 350/96 WG |
| 3,879,207 | 4/1975 | Hartman........................... | 106/50 |

FOREIGN PATENTS OR APPLICATIONS
214,055   5/1968   U.S.S.R.............................. 106/52

OTHER PUBLICATIONS
Newns, G. R. et al., "Low-Loss Glass for Optical Transmission" Electronics Letters, 10 (10) May 16, 1974.

Klyuev, V. P. et al., "Effect of Heat Treatment on the Viscosity of Sodium Silicate and Sodium Borosilicate Glasses" — Chem. Abstracts 72 (1970) item 35192c, p. 279.

Weyl, W. A. — Coloured Glasses—Pub. London (1959) pp. 101-120, 504-505.

Scott, B. et al. — "Techniques for Producing Low Loss Glasses for Optical Fibre Communication Systems" — Glass Technology 14 (5) Oct. 1973, pp. 114-124.

*Primary Examiner*—Helen M. McCarthy
*Attorney, Agent, or Firm*—Kemon, Palmer & Estabrook

[57] ABSTRACT

A particular range of glass compositions in the soda-boro-silicate glass system has been found to be particularly suitable for ultra-low loss dielectric optical waveguides. The composition range is indicated in FIG. 1 of the specification. By preparing such glasses in a reducing atmosphere (0–20% CO in $CO_2$) and adding about 1% $As_2O_3$ to the melt attenuation coefficients due to copper and iron can be minimised. The water content of the glass can be reduced by bubbling dry CO in $CO_2$ through the molten glass. Glasses containing less than 30% $Na_2O$ by weight have the lowest losses. Using glasses of this type dielectric optical waveguides having an insertion loss of less than 14 $dBKm^{-1}$ have been made.

5 Claims, 7 Drawing Figures

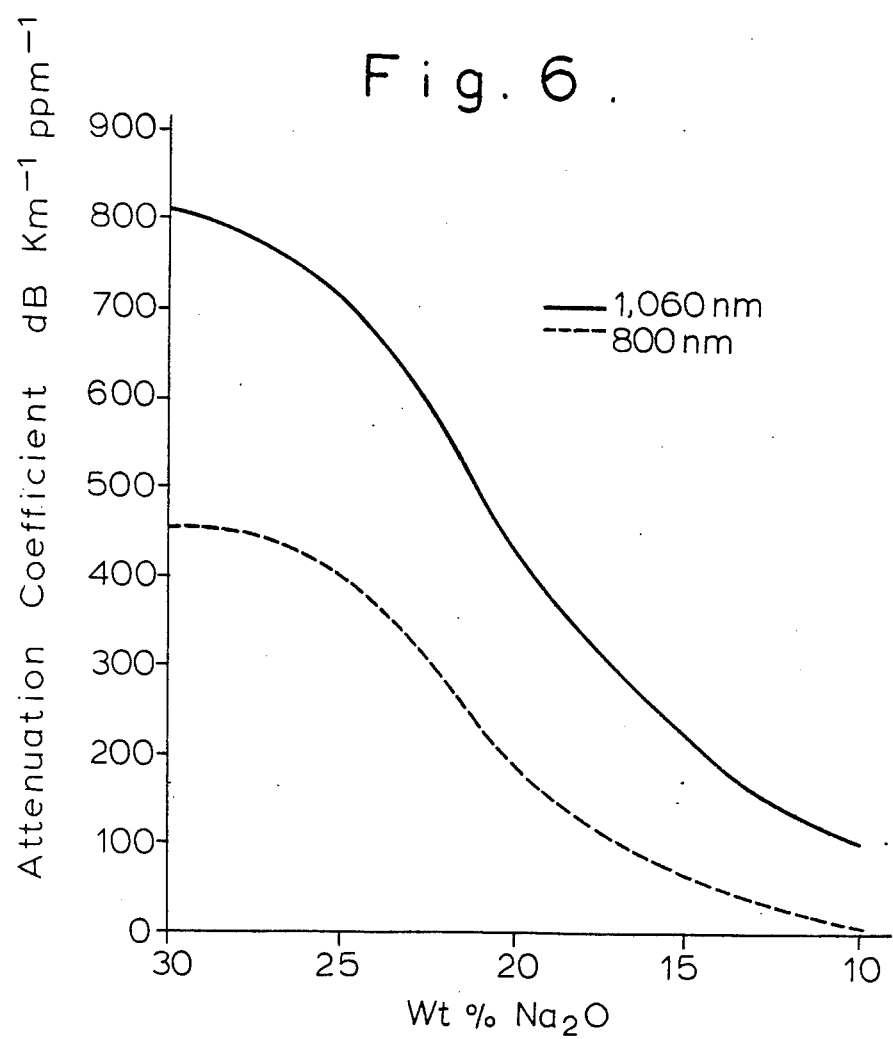

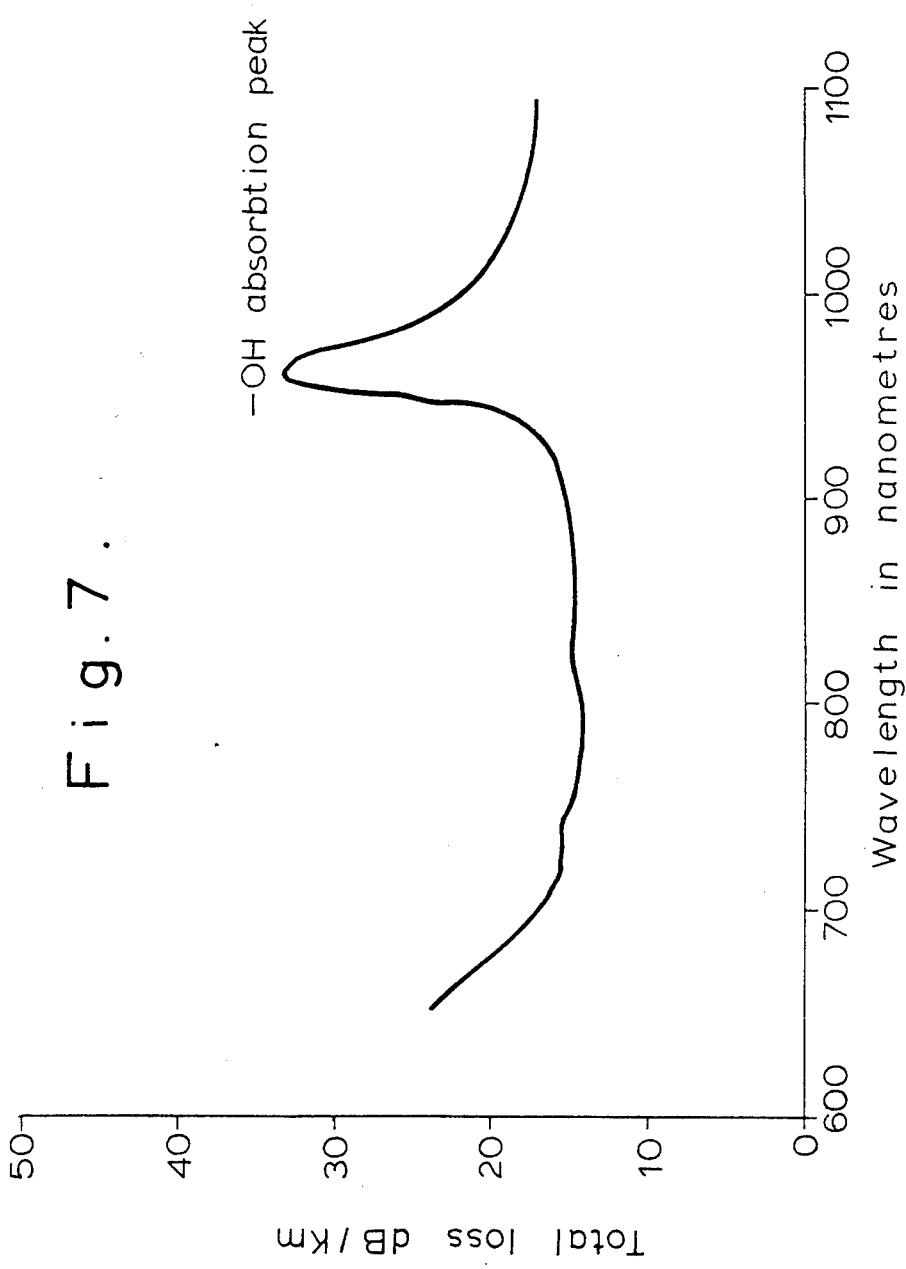

SODIUM BOROSILICATE GLASSES FOR DIELECTRIC OPTICAL WAVEGUIDES

The present invention relates to dielectric optical waveguides, glasses for use in dielectric optical waveguides, and methods of making glasses for use in dielectric optical waveguides.

In order to produce dielectric optical waveguides suitable for use in telecommunications systems it is necessary to ensure that the loss in the dielectric optical waveguides is of the order of 20 dB/Km or less. This requirement imposes severe conditions on the quality of the glasses from which the dielectric optical waveguides are made. For example it is important that such glasses should have a low concentration of transition metal ions and water, which give rise to absorption bands. It is also important that phase separation and devitrification should not occur in the glasses when the fibre is drawn, because even if present to only a slight extent, these effects will result in glasses with a high scatter loss.

Up to the present time greatest success has been encountered with pure and doped vitreous silicas. It is possible to produce vitreous silica in an extremely pure state, so that absorption losses due to impurities are as low as 2 dB/Km. In order to produce a second glass with a refractive index different from that of pure silica, small quantities of dopants are added, e.g. titanium dioxide. In this way dielectric optical waveguides can be made with a doped silica core and pure silica cladding. Such dielectric optical waveguides have an extremely low loss. However because of the higher softening point of vitreous silica, there are difficulties in the preparation of dielectric optical waveguides from these materials. For example the usual technique used in the fabrication of dielectric optical waveguides is to prepare a preform consisting of a clad rod and then draw this down to a suitable diameter to form the dielectric optical waveguide.

From the point of view of convenience of manufacture the double crucible technique for drawing fibres is ideal.

This technique involves melting two glasses, one in a first crucible and the other in a second crucible, the first crucible located within the second crucible. Both crucibles have drawing nozzles. The fibre thus formed is a clad fibre which is capable of acting as a dielectric optical waveguide.

Ideally low melting point glasses are required for the double crucible technique. However, such glasses are complex, containing as a rule, at least three oxides, and this introduces problems in keeping the glass losses at a sufficiently low level to permit the production of satisfactory dielectric optical waveguides.

The present invention is concerned with a particular glass system, namely the alkali oxide-boro-silicate system, which is capable of yielding low melting point glasses (glass forming temperatures in the region of 800°C to 1300°C), methods of producing these glasses and dielectric optical waveguides formed from these glasses. (The alkali oxides are the oxides of lithium, sodium, potassium, rubidium, and caesium). In particular the present invention is concerned with glasses in the soda-boro-silicate system, dielectric optical waveguides made therefrom, and methods of preparing such glasses. In order that such glasses be suitable for use in dielectric optical waveguides they should have low absorption and scatter losses, the combined losses being less than 20 dB/Km in the bulk glass. This necessarily means that the glasses should be free of phase separation and de-vitrification, and have a low concentration of transition metal ions exhibiting absorption bands in the visible or near infra-red region of the spectrum. As will become apparent hereinafter, the glasses of the present invention contains small quantities of arsenic trioxide (less than 5% by weight, more usually between 0.01% and 1% by weight) as a result of the methods of preparation. It should be understood, therefore, that any reference to an alkali oxide-boro-silicate, or soda-boro-silicate glass is also to be interpreted as referring to the glass when it contains arsenic oxides in addition to soda, silica, and boric oxide.

According to a first aspect of the present invention there is provided a soda-boro-silicate glass for use in fabricating dielectric optical waveguides, in that said glass has a composition lying within the range of compositions defined by region A of FIG. 1, and further characterised in that said glass contains 0.01 – 5% by weight of a redox buffering oxide e.g. $As_2O_3$ or $Sb_2O_3$.

According to a second aspect of the present invention there is provided a dielectric optical waveguide characterised in that both said core and said cladding consist of alkali-boro-silicate glasses.

According to a third aspect of the present invention there is provided a method of preparing an alkali-boro-silicate glass for use in dielectric optical waveguides by melting appropriate batch materials to produce molten glass, characterised in that a mixture of carbon monoxide and carbon dioxide is bubbled through the molten glass.

Embodiments of the invention will now be described by way of example with reference to the accompanying drawings in which:

FIG. 6 shows a plot of attenuation coefficient due to iron at two wavelengths, as a function of soda content for glasses in the soda-boro-silicate system.

FIG. 7 shows a graph of total attenuation versus wavelength for a soda-boro-silicate dielectric optical waveguide.

Figure 2:
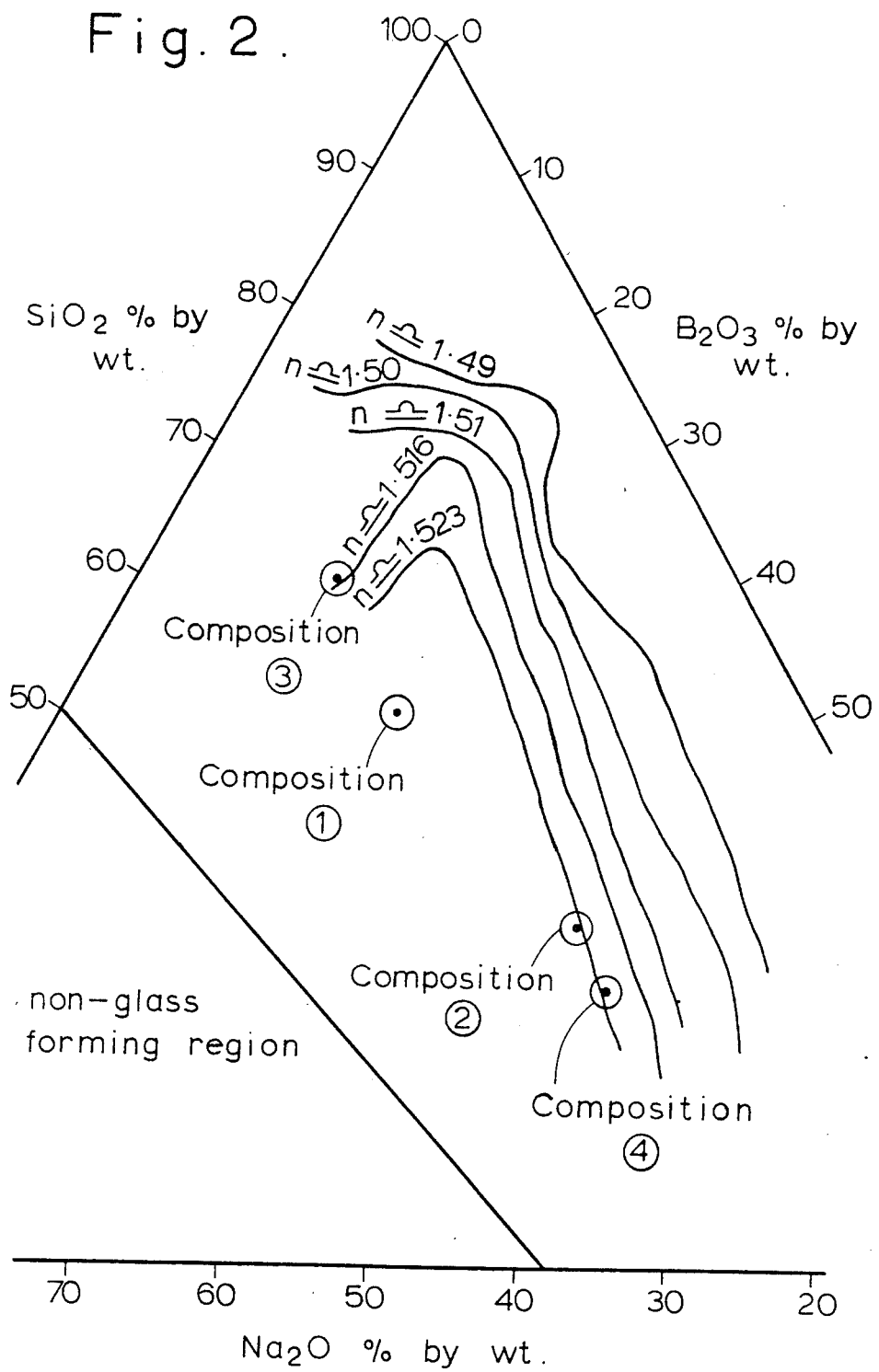
FIG. 2 shows iso-refractive index plots for the soda-boro-silicate system.
Figure 3:
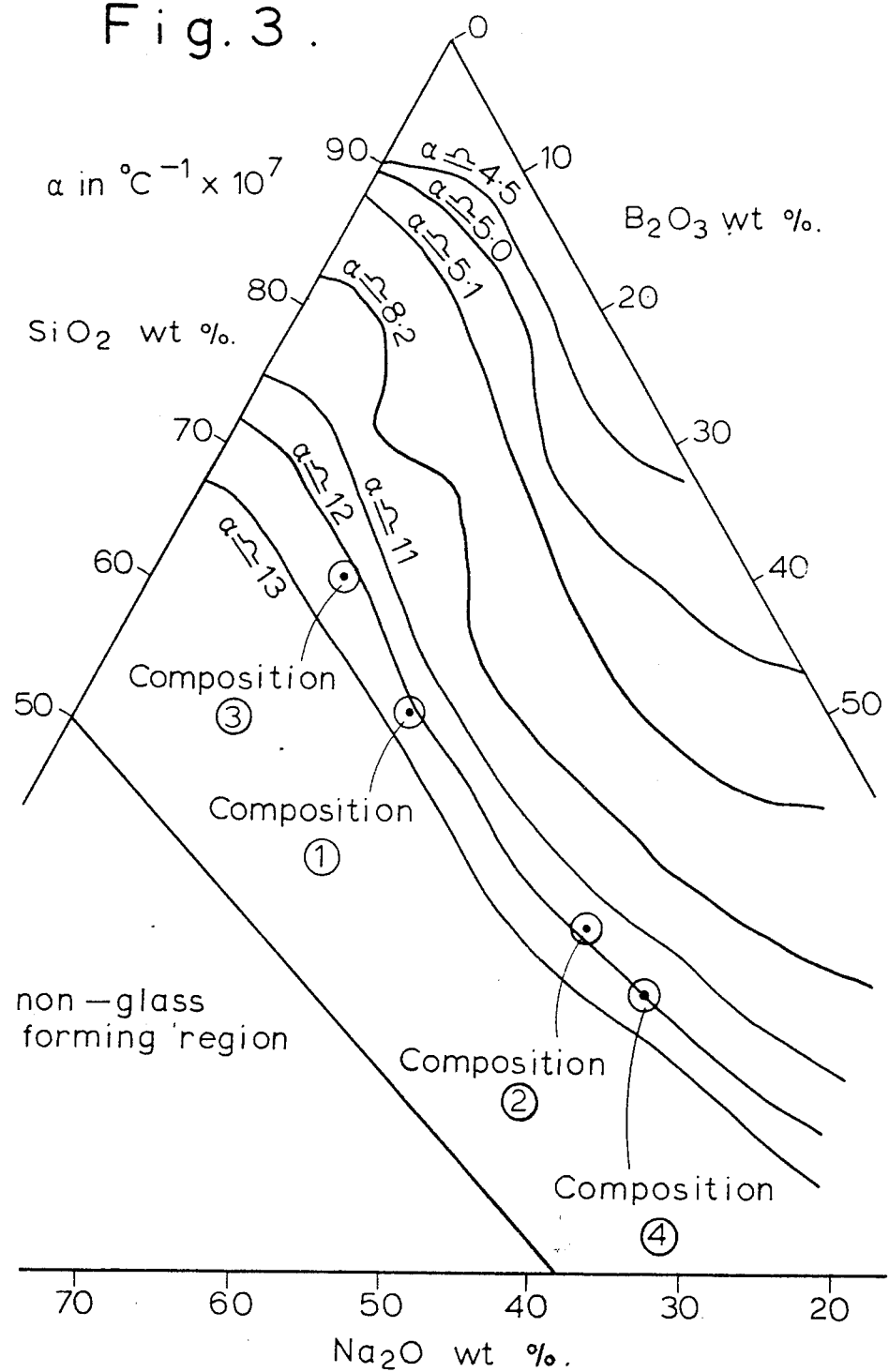
FIG. 3 shows iso-thermal expansion coefficient plots for the soda boro-silicate system.

N.B. FIGS. 2 and 3 are drawn from published information and are only approximate.

Figure 1:
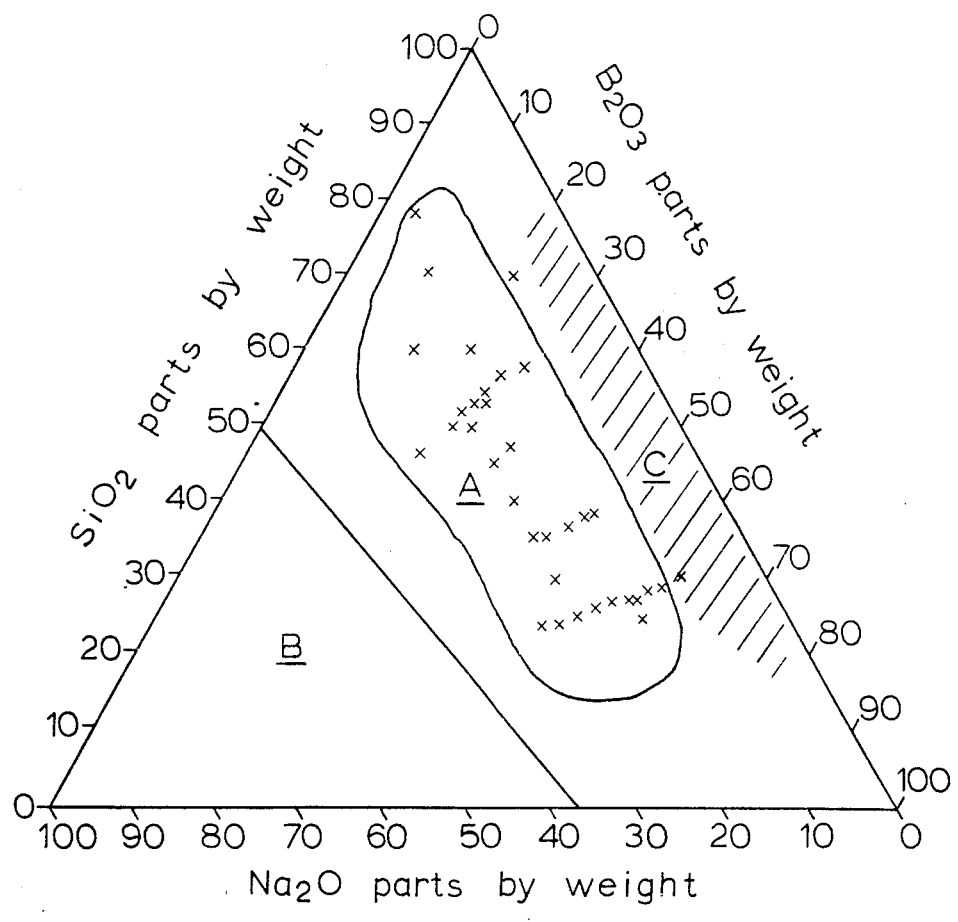
FIG. 1 shows the composition range of glasses in the soda-boro-silicate system.

It has been found that glasses having compositions in the Region A of FIG. 1 can be made in a form suitable for use in dielectric optical waveguides. These glasses have compositions lying outside the composition range of nonglass formation (Region B of FIG. 1) and phase separation (Region C of FIG. 1). Glasses having the composition set out in Table 1 have been prepared in a form having a suitably low loss to permit their use in dielectric optical waveguides (with the exception of glasses 28, and 31).

However it is believed that all compositions falling within Region A of FIG. 1 are suitable for use in dielectric optical waveguides. Glasses having compositions defined in this way should have a low scatter loss, because they lie outside the region of phase separation, C, and well within the glass forming region, so that devitrification and nucleation should not occur. All the glasses in Table 1 contain between 0.1% and 1% by weight of arsenic trioxide because of the way in which they are made.

TABLE 1

| Glass No. | $SiO_2$ | $B_2O_3$ | $Na_2O$ |
|---|---|---|---|
| 1 | 50 | 22.5 | 27.5 |
| 2 | 35.3 | 41 | 23.7 |
| 3 | 60 | 13 | 27 |
| 4 | 25 | 50 | 25 |
| 5 | 25 | 58 | 17 |
| 6 | 37 | 43 | 20 |
| 7 | 38 | 44.5 | 17.5 |
| 8 | 58 | 27 | 15 |
| 9 | 57 | 25 | 18 |
| 10 | 47.2 | 31.1 | 21.7 |
| 11 | 52 | 23 | 25 |
| 12 | 53.5 | 24 | 22.5 |
| 13 | 55.5 | 24.5 | 20 |
| 14 | 57 | 25.5 | 17.5 |
| 15 | 46.5 | 20.5 | 33 |
| 16 | 23.5 | 46.5 | 30 |
| 17 | 24 | 48.5 | 27.5 |
| 18 | 26 | 51.5 | 22.5 |
| 19 | 27 | 53 | 20 |
| 20 | 27.5 | 55 | 17.5 |
| 21 | 50 | 25 | 25 |
| 22 | 45 | 30 | 25 |
| 23 | 40 | 35 | 25 |
| 24 | 35 | 40 | 25 |
| 25 | 30 | 45 | 25 |
| 26 | 70 | 10 | 20 |
| 27 | 60 | 20 | 20 |
| 28 | 70 | 20 | 10 |
| 29 | 28.5 | 56.5 | 15 |
| 30 | 29 | 58.5 | 12.5 |
| 31 | 30 | 60 | 10 |
| 32 | 40 | 47 | 13 |
| 33 | 28 | 55 | 17 |
| 34 | 78 | 5 | 17 |

Compositions in the above table are in parts by weight, and are indicated by X in FIG. 1.

The principal problem in producing glasses in the soda-boro-silicate system, which are suitable for dielectric optical waveguides is to ensure that optical absorption due to impurities, mainly iron and copper, are kept to an acceptable level. In glasses produced by usual techniques, the attentuation coefficient of copper in e.g. glass 2 is 500 to 1200 dB per Km per ppm and the attenuation coefficient of iron is about 2 dB per Km per ppm. Copper and iron are usually present in the ratio of ten parts iron to one part copper. The iron absorption loss is due to iron in the ferrous or reduced state, i.e. is due to $Fe^{++}$ ions, while the copper absorption loss is due to copper in the cupric or oxidised state, i.e. $Cu^{++}$ ions. The oxidation reactions are set out below.

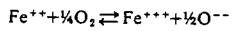

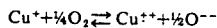

The requirements on the redox state of the glass to minimise the absorption losses of iron and copper are therefore opposite, and it would appear at first sight that nothing can be done to reduce the combined absorption coefficient.

However it has been found that for a particular redox state the total absorption coefficient is a minimum.

The optimum redox state, which may be identified by the copper attenuation coefficient, may be determined either by trial and error, or by the technique described in our co-pending U.K. Pat. application No. 53804/74.

Glasses made with this redox state in fact proved to have a sufficiently low absorption coefficient to permit their use in dielectric optical waveguides typically the total loss of dielectric optical waveguides made from glasses in this optimum redox state, are less than 14 dB/Km, and a portion of this loss is due to water.

In order to produce a glass with the desired redox state, a reducing gas i.e. a gas having a very low effective partial pressure of oxygen, in this case a mixture of carbon dioxide and carbon monoxide is bubbled through the glass, carbon monoxide forming 0 – 20% of the gaseous mixture. If the glass is fined in air the carbon dioxide - carbon monoxide mixture should contain 9–18% carbon monoxide giving an effective partial oxygen pressure of the order of $10^{13}$ atmospheres at 1,000°C. The bubbling process also serves to homogenise and dry the glass. The glass melt is at a temperature in the range 800°C to 1400°C during the bubbling process. For batch weights of 200 grams to 1000 grams a flow rate of carbon monoxide carbon dioxide mixture of 100–200 cc per minute is used; and the treatment is maintained for a period of between one half-hour and two-hours. The bubbling process may be carried out as soon as the batch materials have melted, or it may be delayed for a period of time after the batch has melted. It has been observed that the copper absorption loss falls as the temperature at which the glass is melted is raised and the iron absorption loss increases as the temperature at which the glass is melted is raised. The melting temperature is thus an important parameter in producing glasses with minimal absorption loss.

It has been found that optimum results are obtained with a melting temperature of 1100°C with the compositions normally used. Higher temperatures may be required for other glass compositions. This dependence of absorption loss on temperature is almost certainly due to the effect of temperature on the redox state of the glass.

It has also been found that the absorption loss due to copper and iron is dependent on the boric oxide content of the glass, the absorption loss drops as the boric oxide content rises. The explanation of this effect is uncertain. Typically glasses treated in this way have an attenuation coefficient, e.g. for glass 2 for copper of 100–200 dB per Km per ppm and for iron of 30–50 dB per Km per p.p.m.

Because of the difference in wave lengths between the cupric and ferrous absorption peaks, 810 nm and 1,060 nm respectively, (the ferrous absorption is approximately 60% of its peak value at 800 nm), the different concentrations of copper and iron in the glass the effects of arsenic trioxide in the melt (to be discussed later), it is impossible to give a definitive explanation of why the absorption loss due to copper and iron should be a minimum for a particular redox state.

It should be noted that the batch material used for the manufacture of glasses described in this specification are commercially available materials. Typically the batch materials contain between 0.05–0.2 ppm of iron, 0.01 – 0.04 ppm of copper, less than 0.05 ppm of chromium, and less than 0.01 ppm of other transition elements. Presumably by reducing the impurity content of the batch materials further reduction in absorption loss could be obtained.

If nothing is done to the melt apart from adjusting its redox state to the desired condition, the redox state would change rapidly when the gas flow through the glass ceased. Since the glass must be allowed to stand in the molten condition for several hours to permit gas bubbles to escape from the melt this means that the final glass would not have the optimum absorption coefficient because of the change in the redox state. Further changes in the redox state would occur when the glass was remelted in a double crucible prior to fibre drawing.

To prevent this occurring 0.1% to 1% by weight of arsenic trioxide is added to the batch materials. The arsenic trioxide acts as a buffer against changes in the redox state, so that the melt can be held at high temperature for a considerable period (up to 40 hours) without major alteration of the redox state. The addition of arsenic trioxide thus permits the glass to be fined, drawn into rod, and remelted in a double crucible and still retain the optimum low absorption loss induced by the carbon dioxide carbon monoxide treatment. The only requirements on the quantity of arsenic trioxide added to the melt are firstly, that the concentration of arsenic in the melt should be much higher than the concentration of iron and copper combined, and secondly that the arsenic trioxide concentration should not be so high that the properties of the glass are greatly modified. It is believed that these conditions are satisfied when the quantity of arsenic trioxide added to the melt is between 0.01% and 5% by weight. The optimum amount of arsenic trioxide is about 1%. As reported in "Low-Loss Glass for Optical Transmission" by Newns et al Electronics Letters Vol. 10 No. 10 May 16, 1974, the reduced glasses have bulk losses of 15–25dB per Km compared with 80 – 120dB per Km for the oxidised glass.

The arsenic trioxide also has a cooling reaction with iron which tends to reduce the attenuation coefficient for iron in the glass.

Antimony trioxide can also be used as a redox buffering oxide, and it is believed that cerium oxide should also work.

In order that the total loss should be low, it is preferable that the OH content be less than 20 ppm. To achieve this the batch powders are individually baked in vacuo at 250°C prior to mixing. The $CO/CO_2$ mixtures are dried with molecular sieves to a dew point of −60°C to −65°C. The glass is then fined in dry $CO_2$ (dew point −60°C) or dry nitrogen (dew point −70°C). In this way OH contents for glasses 2, 3, and 4 have been reduced to less than 10 ppm. This is essential for ultra-low loss fibres i.e. total losses less than 10 dB per Km.

In selecting glass pairs from the soda-boro-silicate system for the production of dielectric optical waveguides (i.e. two glasses, one for the core of the dielectric optical waveguide, the other for the cladding) it would appear to be necessary to ensure that the glasses have a suitable difference in refractive index, typically 1% and that the expansion coefficients are similar so that the drawn dielectric optical waveguide is stress free. The selection of suitable compositions can be made with the aid of FIGS. 2 and 3, FIG. 2 shows approximate iso-refractive index lines plotted for variations in composition, and FIG. 3 shows approximate iso-expansion coefficient lines plotted against composition, (lines of constant refractive index and expansion coefficient respectively).

From FIG. 3 it can be seen that glasses 1, 2, 3 and 4 of Table 1 have roughly the same expansion coefficient and so should enable stress free dielectric optical waveguides to be fabricated. As previously mentioned the absorption loss decreases with increasing boric oxide content, thus glass 4 has the lowest loss followed by glass 1 and 2 and glass 3 has the highest loss. From FIG. 2 it can be seen that glass 3 has a lower refractive index than the glasses 1, 2 or 4. Thus dielectric optical waveguides can be made with cores of glasses 1, 2 or 4 and claddings of glass 3. Glass 4 is preferred as the core composition. When dielectric optical waveguides are drawn from a double crucible using glasses 2 and 3, a great deal of electrolytic bubble formation occurs which results in a dielectric optical waveguide with a high scatter loss, (in this case scattering at core-cladding boundary). This effect may be removed by keeping the oxygen partial pressure low during pulling.

Dielectric optical waveguides having particularly desirable characteristics have also been fabricated using glass 2 as the core glass and glasses 6 or 7 as the cladding glasses.

The lowest total losses have been obtained with dielectric optical waveguides made from glass 4 as core and glass 3 as cladding. These dielectric optical waveguides may have a total insertion loss lower than 14dB per Km at a wavelength of 750 nm – 850 nm.

The insertion loss as a function of wavelength is shown in FIG. 7, for a typical dielectric optical waveguide having a core of glass 4 and a cladding of glass 3. The absorption peak is the 2nd overtone of the OH fundamental.

It has been found that the attenuation coefficients due to iron falls as the percentage of soda in a soda-boro-silicate glass is reduced. Decreasing the soda content however does not affect the copper attenuation. This means that the total loss of the glass can be reduced by reducing the soda content. Decreasing the soda content also causes attenuation coefficients due to cobalt and nickel to fall, has no effect on the attenuation coefficient of manganese and raises the attenuation coefficient of chromium. The experimental data establishing this is now discussed.

The following compositions were prepared by bubbling the melts for 1 hour with $CO_2$ and fining in air: 16, 17, 4 18 and 19.

The following compositions were prepared by bubbling the melts for 2 hours with 18% CO – 82% $CO_2$, fining in the same atmosphere and doping them with 0.05 wt % $Fe_2O_3$ : = 16, 4, 19, 20, 29, 30, and 31. (These glasses can of course be prepared without added iron). The doped glasses of compositions 16 and 4 were blue and the rest were colourless. Nevertheless, they all gave ferrous ion absorption peaks that could be measured. The attenuation coefficients and refractive indices of the glasses were measured.

Figure 4:
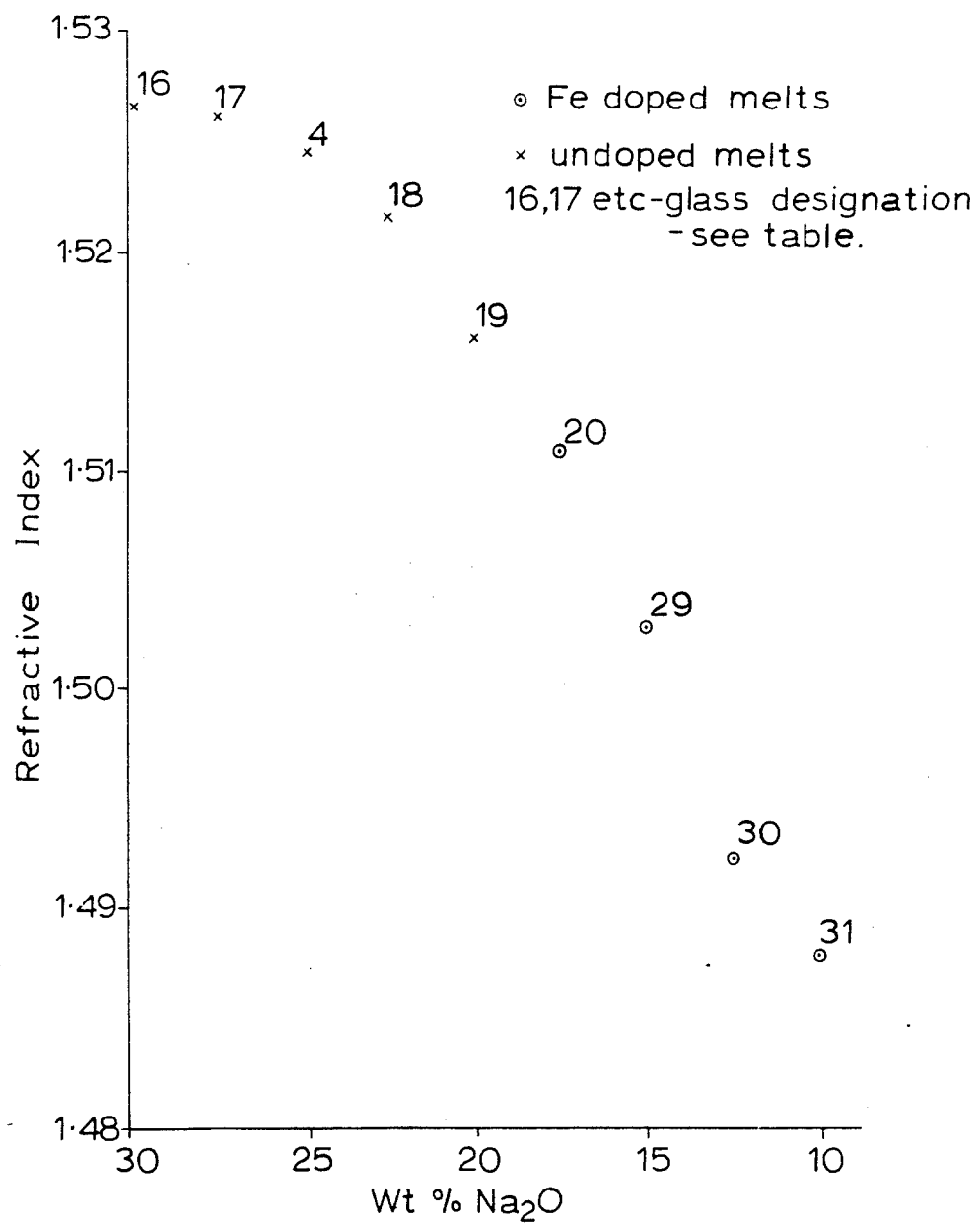
FIG. 4 shows a plot of refractive index versus soda content for soda-boro-silicate glasses having a low soda content.

The refractive index decreased rapidly as the $Na_2O$ content decreased below 27.5% (FIG. 4). Composition 31 (containing 10% $Na_2O$), phase-separated, but would be expected to be about 1.48, as the binary (67% $B_2O_3$ 0.33% $SiO_2$) is known to be about 1.45 – 1.46 from literature.

Figure 5:
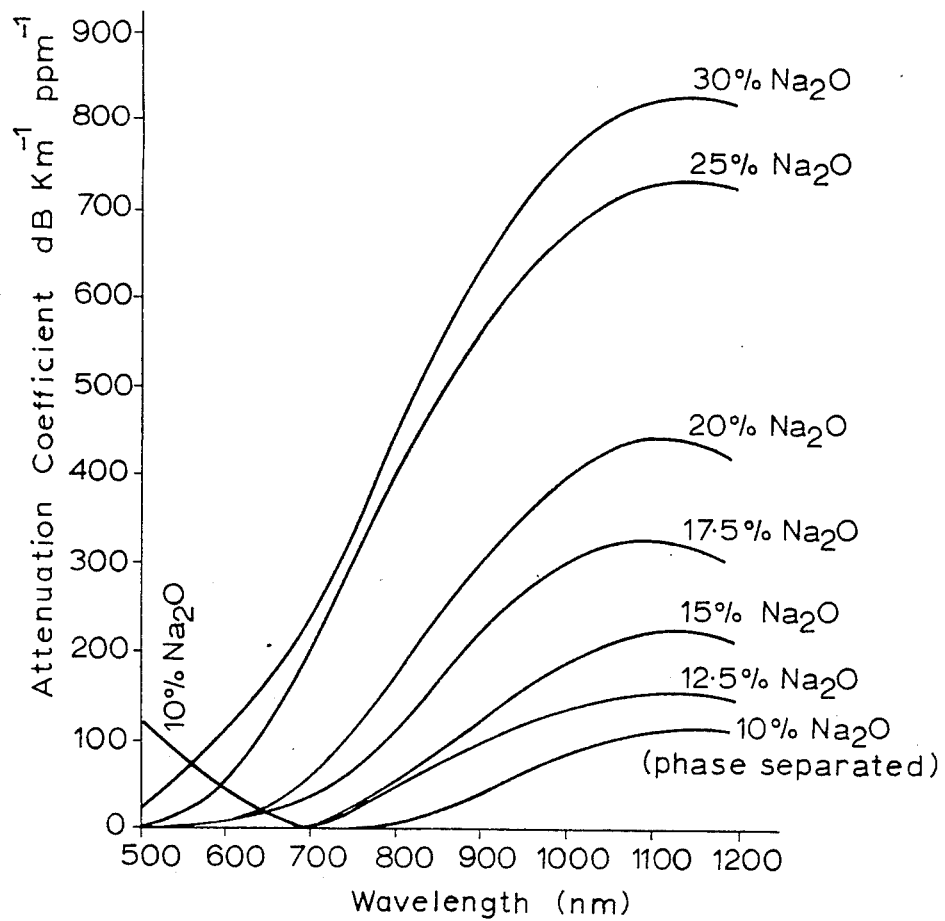
FIG. 5 shows a plot of attenuation coefficient of iron versus wavelength for various soda-boro-silicate glasses.

Attenuation coefficients due to Fe are plotted out in FIG. 5. The ferrous ion coefficient decreases as the $Na_2O$ content decreases. The effect is shown more clearly in FIG. 6, where the attenuation coefficient is plotted as a function of the $Na_2O$ content, at 800 and 1060 nm.

In order to determine the copper attenuation coefficient composition 29 was prepared, containing 0.1% by weight of Cu. The glass was colourless, showing that nearly all the copper had been reduced to $Cu^+$.

Had a redox effect been present in the glass, it would have been expected that the Cu coefficient would have increased (as the corresponding Fe coefficient had decreased).

However, as the Cu coefficient was also low, it would indicate that the cause is a change in extinction coefficient rather than a redox effect. This has been confirmed by analysis of the glasses for $Fe^{2+}$. All the glasses have 85–95% of the total iron in the $Fe^{2+}$ state.

From the results of refractive index and attenuation coefficient measurements, it should be possible to select a core and cladding composition that have a lower $Na_2O$ content, with the required refractive index difference, and lower absorption due to Fe. The unchanged copper attenuation coefficient allows a more favourable optimisation of Fe and Cu loss (at a higher state of reduction).

Possible disadvantages are that the tendency to phase separate increases as the $Na_2O$ content decreases, and glasses with low $Na_2O$ contents are more difficult to dry.

N.B. None of the iron doped glasses have arsenic added. The set of experiments are useful only for comparison. The attenuation coefficients are not the same as pure melts, which have arsenic added to lower the $Fe^{2+}$ content and thus the attenuation coefficient.

Fibres with total insertion loss of less than 18dB/Km have been made with glasses 32 and 33. A substantial proportion of the loss was due to water absorption.

What is claimed is:

1. A reduced soda-boro-silicate glass for use in fabricating dielectric optical waveguides having a total insertion loss of less than 20 dB/km, said glass having an OH content less than 20 ppm, a composition lying within the range of compositions defined by Region A of FIG. 1, and lying outside the region of phase separation of soda-boro-silicate glasses, said glass containing between 0.1% and 5% by weight of a redox buffering oxide to minimize absorption due to presence of transition metal ion impurities, said oxide being selected from the group consisting of arsenic trioxide, antimony trioxide and cerium oxide.

2. A soda-boro-silicate glass as claimed in claim 1 wherein said redox buffering oxide is arsenic trioxide.

3. A soda-boro-silicate glass as claimed in claim 2, said glass containing less than 30% by weight of $Na_2O$.

4. A dielectric optical waveguide having a core and cladding both consisting of soda-boro-sillicate glass compositions in accordance with claim 1, in which the refractive index of the glasses differs by at least 1%, the cladding glass refractive index being lower than that of the core glass, and the total insertion loss being lower than 20 dB/km at a wavelength of between 750 mm – 850 mm.

5. A dielectric optical waveguide as claimed in claim 4 wherein said soda-boro-silicate glasses contain less than 30% by weight of soda.

* * * * *